United States Patent [19]
Boehly et al.

[11] 3,920,901
[45] Nov. 18, 1975

[54] GENERATOR USED FOR TIME SYNCHRONIZATION IN VIDEO-TELEPHONE

[75] Inventors: Michael A. Boehly, Rochester; Uno Randmere, Victor, both of N.Y.

[73] Assignee: Stromberg-Carlson Corporation, Rochester, N.Y.

[22] Filed: May 7, 1974

[21] Appl. No.: 467,761

[52] U.S. Cl. .......................... 178/69.5 G; 179/2 TV
[51] Int. Cl.$^2$ .................... H04N 5/06; H04M 11/06
[58] Field of Search .............. 179/2 TV; 178/69.5 G

[56] References Cited

UNITED STATES PATENTS 3,716,795 2/1973 Brown .......................... 178/69.5 G

*Primary Examiner*—Kathleen H. Claffy
*Assistant Examiner*—George G. Stellar
*Attorney, Agent, or Firm*—William A. Marvin; William F. Porter, Jr.

[57] ABSTRACT

A timing generator is disclosed that is particularly adapted for use in video-telephones for synchronization of control signals to a device which forms a subscriber image. The synchronization is performed by the division of a crystal controlled oscillator frequency by first and second counting means. The first counting means generates the basic horizontal scan rate and the second counting means generates the basic vertical scan rate. Each counting means initiates a plurality of signals, synchronously with the oscillator frequency between the two basic scan rates, which are used to set or reset a plurality of bistable multivibrators and thereby generate the synchronous control signals. In a first embodiment, generally available MSI circuit packages are used to implement the teachings of the invention. In a second embodiment both counting means and the plurality of bistable multivibrators are produced by MSI or LSI circuit techniques allowing the entire generator to be formed into three integrated circuit packages.

10 Claims, 7 Drawing Figures

GENERATOR USED FOR TIME SYNCHRONIZATION IN VIDEO-TELEPHONE

BACKGROUND OF THE INVENTION

The invention relates generally to the synchronous generation of control signals in television systems and more particularly to the development of an MSI generator for video telephones.

Video-telephone systems generally must develop identical types of control signals as are used in normal television systems. Usually the control signals of a common or commercial television system consist of a horizontal and vertical drive, horizontal and vertical blanking, combined into one signal, and a composite of horizontal and vertical sync signals. In addition a video-telephone system must generate a "bar" signal that may be initiated or terminated at any time while retaining synchronous operation with the remaining signals. The bar signal is provided by the video-telephone for the privacy of a subscriber who does not wish to be seen but wishes to transmit audio information to another station.

In prior art television systems sync generation is usually accomplished with monostable or one-shot multivibrators having adjustable time pulse widths. The pulse widths are determined by the RC time constants of the systems and generally must be constantly adjusted or aligned to remain in tolerance. These asynchronous techniques have been replaced more recently with synchronous digital counting techniques that are more readily implemented into MSI and LSI packaging.

The packaging of circuitry into MSI or LSI circuits is more critical to video-telephones than it is to the normal television system because the system must be of a size that may be used on a desk, similar to a normal telephone, rather than of typical television receiver size.

Synchronous techniques for the generation of television signals that are known to the art include shift registers, binary counters, and modulo binary counters.

Binary counters which perform frequency divisions are useful in sync generation; however the generation of the synchronous signals must be performed by a multiplicity of logic gates indicating the coincidence of simultaneous count conditions. A counter of sufficient divisional capability and the associated logic gates may be difficult to integrate into a single chip of reasonable size.

Some of the problems encountered with binary counters using a large number of simultaneous coincidence gates have been solved by the introduction of modulo-counting. This technique provides counter intervals which coincide with a majority of the pulse widths of the required synchronous generation. There are drawbacks to modulo counting that cannot be overcome easily because they are inherent in the basic technique. One drawback encountered in modulo counting is the requirement for using a clock which has a pulse width equal to that of the smallest pulse width needed for the control signals. Rather than having clock pulse widths equal to the smallest pulse width, it is a great advantage when counting in video telephones to run a clock at a higher frequency to allow the use of a smaller crystal with more stability and to eliminate the need for a temperature controlled oven. This reduction in size of other components is desired in video-telephone applications for the above mentioned reasons.

Shift registers have also been used for the division of frequency, but the number of stages needed is generally greater than that required with binary counters. For example, a four stage binary counter has the capability to divide by 16 while a five stage shift register generally divides by ten (e.g., by twice the number of stages).

BRIEF DESCRIPTION OF THE INVENTION

The invention features the use of synchronous digital counting techniques to divide a crystal controlled oscillator frequency into a multiplicity of time intervals that are selectively used to set or reset a plurality of multivibrators, thereby generating all needed synchronous controlling signals for a video-telephone.

In addition to the common control signals generated, a privacy bar signal is included to permit a subscriber to generate an audio signal to another station while not transmitting a video representation of himself.

Two counting means are used to provide signals that are coincident with the major horizontal and vertical scanning rates. Further, the counting means provide signals intermediately spaced between the two basic rates along a plurality of decoding lines that may be combined by a minimum of simultaneous coincidence circuitry to control the bistable multivibrators. These counting means divide the frequency of a crystal controlled oscillator that is run at a greater rate than the minimum pulse width needed for the display to permit a smaller component crystal to be used.

The division of the synchronous generator into one counting means for a horizontal signal generator and another for a vertical signal generator while using synchronous digital counting techniques allows the generator to be readily implemented using MSI or LSI packaging while using an optimal number of dividing stages.

Therefore, it is a major object of the invention to provide display control signals for video telephones using a minimum amount of componentry and space. In accordance with the major object of the invention, it is a further object to provide a synchronous digital generator suitable for MSI and LSI packaging techniques and to provide for the reduction in size of the crystal oscillator.

Other objects, features, and utilities of the present invention will become more readily apparent from the following detailed description of a preferred embodiment and referenced drawings herein.

DETAILED DESCRIPTION OF THE PREFERRED EMBODIMENTS

Figure 1:
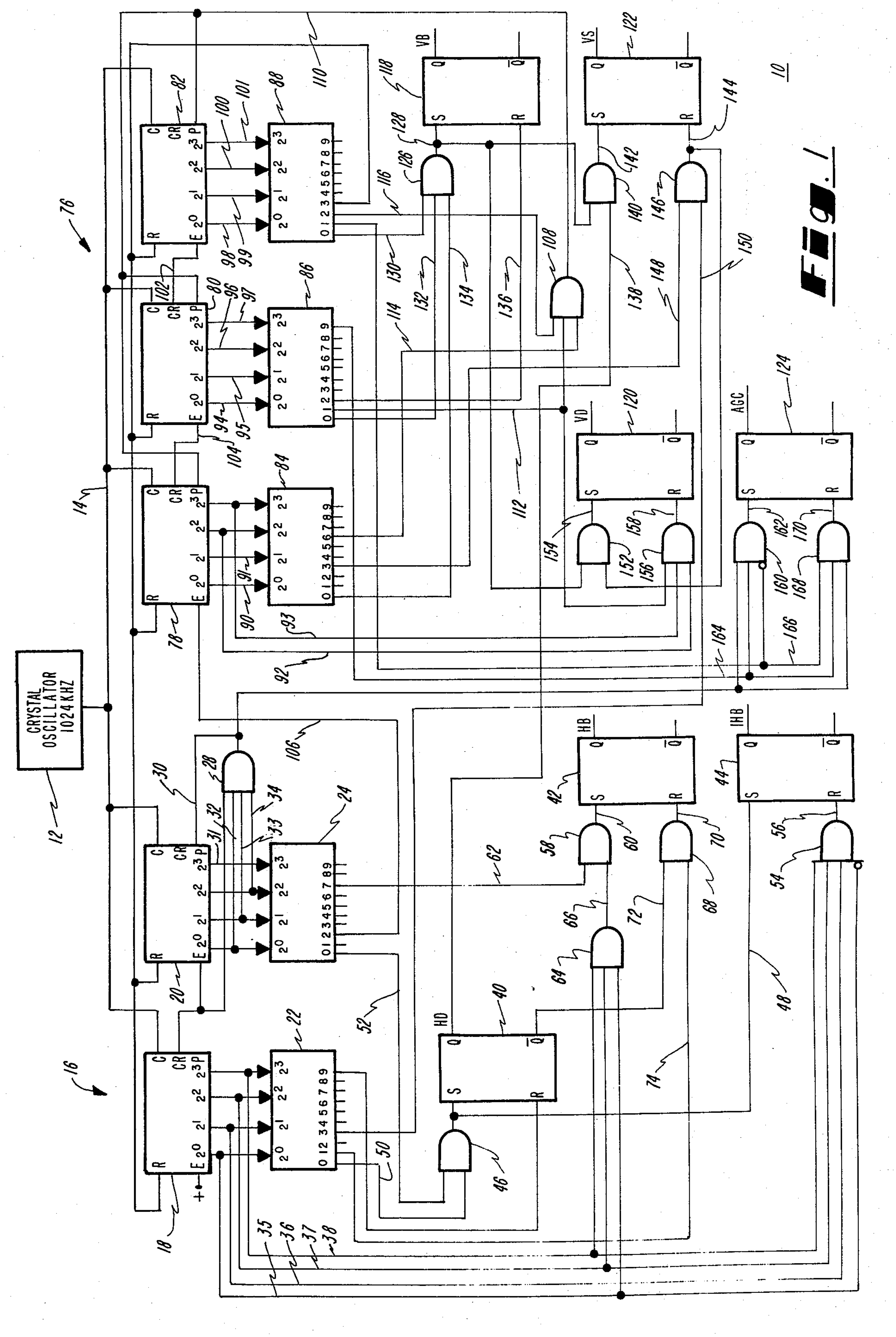
FIG. 1 is a schematic diagram of an MSI implementation of the invention using commercially available packages.

The invention is readily implemented into a number of preferred embodiments and is shown to advantage in FIG. 1 where commercially available MSI circuit packages are used to form a video telephone timing generator.

These MSI circuit packages are available from many sources and any $T^2L$ family of logic or other compatible circuitry packages may be used. The family that will be used for the purposes of description in this disclosure is the well known 7400 series of logic. It should be understood that this family is used only for generally describing the type of package to be used in the one preferred embodiment and should not be construed to limit or restrict the invention in any manner.

A timing generator, generally designated by the reference numeral 10 in FIG. 1, initiates two sets or groups of signals. A relatively fast group is provided for controlling the horizontal scanning of a camera or a picture gun in a video telephone set and a relatively slower group controls the vertical scanning. The horizontal scanning group comprises a horizontal drive signal, HD; a horizontal blanking signal, HB; and an Intermediate horizontal blanking signal, IHB. The vertical scanning group comprises a vertical drive signal, VD; a vertical sync signal, VS; a vertical blanking signal, VB; and an automatic gain control signal, AGC. These horizontal and vertical groups may then be combined to form composite sync, composit Intermediate blanking and composite blanking signals and a privacy bar signal, all more fully described hereinbelow.

The basic horizontal scan time rate produced by the generator 10 is 125 microseconds (This sweep is generally termed "one line") while the basic vertical scan rate produced by the generator is 16.6875 milliseconds (generally termed "one field"). Each vertical field is then produced by the sweep of 133½ horizontal lines. As is well known in the television art the half line allows two vertical fields to be interlaced synchronously to form one frame to prevent video flicker. The timing of the generator in this way provides for the initiation of a picture from or to a subscriber terminal at substantially 30 frames per sec.

The generator 10 has a clocking circuit 12 that produces a stable frequency signal along clock line 14 which may be divided into the above mentioned scanning rates. The clocking circuit 12 comprises an oscillator of the crystal controlled frequency type which runs at 1024KHz. The oscillator rate is a full three times faster than the smallest pulse width required, which allows a smaller more stable crystal to be used, and substantially eliminates the need for a temperature controlled oven for frequency stability. A reduction in size of components and the number of elements in video telephones is effected in this way.

The 1024 KHz rate has a time period of 0.9765625 microseconds, hereinafter called "one count" or T for ease of explanation. The basic line or horizontal scan rate is then 128T and the basic field or vertical scan rate is 17,088T. These time periods form the basic frequency division rates to be produced.

The first frequency division by 128T is provided by first counting circuitry 16 including a counter 18 and a counter 20 connected to decoders 22 and 24, respectively. Each counter is a four bit binary ripple counter having inputs (not shown) tied to ground that may be loaded into the counter by a preset input P. The preset input P in this way acts to load a count of 0000 into the counter and essentially functions as a clear. A reset input R is provided also to clear each counter. The counters 18, 20 count whenever signals are applied simultaneously to the clock C and enable E inputs. An instantaneous reading of the count stored may be obtained from outputs $2^0$, $2^1$, $2^2$, $2^3$ that correspond to counts of 0000-1111 binary or 0–15 decimal. Further, each counter 18, 20 has a carry output CR which initiates a carry signal when the counter overflows and the counter 18, 20 begins a zero count once more. A counter of this general description may be a type 74161.

The decoders 22, 24 are four bit binary decoders that take a binary number into inputs $2^0$, $2^1$, $2^2$, $2^3$ and supply a signal on one of ten output decoding lines 0-9 depending upon the count input. On counts 1010-1111 binary there are no outputs on any of the decoding lines 0-9. A 7442 decoder is of this general type.

Counter 18 has its E input connected to a positive voltage to allow it to count continuously the pulses received at the C input from clocking means 12 over line 14, while counter 20 has its E input connected to the CR output of the counter 18 enabling the counter 20 to count only one of every sixteen pulses it receives at its input C over line 14 from clocking means 12. Counter 18 therefore counts unit pulses from the clocking means 12 while counter 20 is a times sixteen counter. The outputs $2^0$, $2^1$, $2^2$, $2^3$ of counters 18, 20 are connected to the respective inputs $2^0$, $2^1$, $2^2$, $2^3$ of the decoders 22, 24 by lines 31-38 and decoded according to their count.

An AND gate 28 provides a preset signal from its output to the P input of counter 20 by means of line 30 when the coincidence of a signal from the CR output of the counter 18 thereby and a count of 1110 binary from the counter 20 is sensed at the inputs of the AND gate 28, over lines 32-34. This count corresponds to 128 decimal or 16 T +7×16 T. In this way the basic horizontal scan rate is generated by the two counters 18, 20 cooperating to count to 128T, then being cleared by gate 28 and beginning the count again.

The majority of the outputs of the counting circuitry 16 appear on the decoding lines 0-9 of decoders 22, 24 to allow a simple combination of two decoding lines to form any counting states represented, rather than combining the coincidence of the eight outputs of the counter 18, 20. The decoded outputs of the counters 18, 20 are used to set and reset bistable multivibrators 40, 42, 44 that generate the horizontal signals HD, HB, IHB, respectively. Each multivibrator has an R input and an S input with Q and Q outputs. A signal to an S input causes a set or high condition to appear on the Q output, while a signal to the R input will cause a reset or low condition at the Q output.

Figure 5:
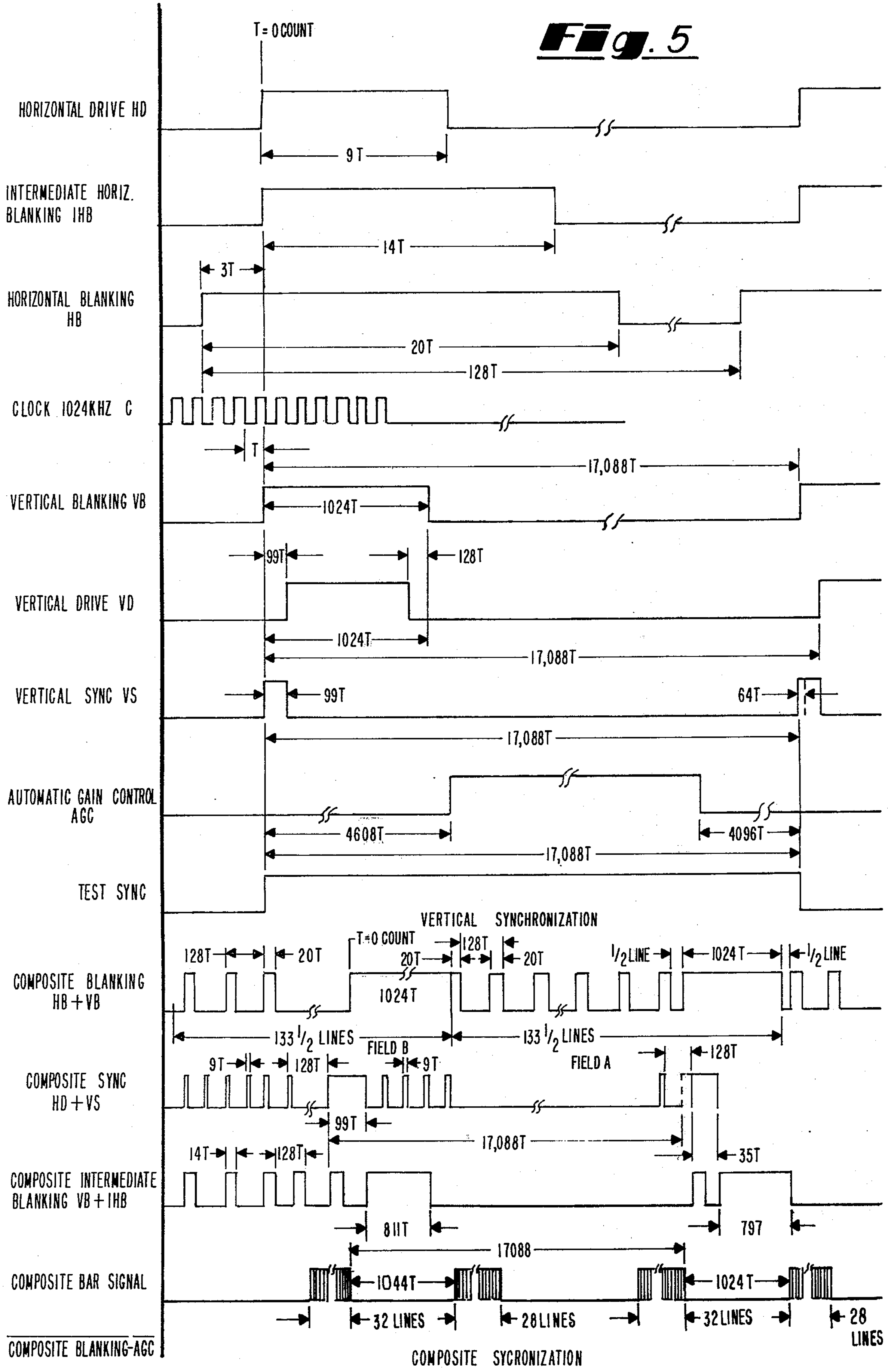
FIG. 5 is a synchronous timing diagram illustrating the video control signals generated by the implementations of FIGS. 1 and 2 through 4.

The timing relationships between these horizontal control signals are shown in FIG. 5, where it is seen, the horizontal drive HD beings at T=0, is 9T in duration, and happens once every horizontal line or 128T. Likewise, the Intermediate horizontal blanking (IHB) control signal begins at a zero count, T=0, has a duration of 14T and also occurs only once every horizontal line or 128T. The horizontal signal having the longest duration is the horizontal blanking signal, HB, which begins 3T before the counter reaches a zero count and continues for 20T thereafter. Again the signal HB occurs only once every horizontal line and is synchronized with the other horizontal control signals.

To generate these signals: The HD multivibrator 40 and the IHB multivibrator 44 are set on a count of 0 by the output of an AND gate 46 transmitting a signal over a line 48 to the S inputs of the multivibrators 40, 44 when the AND gate 46 senses the coincidence of signals on each of the decoding lines 0, 0 of decoders 22 and 24 at its inputs via lines 50, 52. 9T later the HD multivibrator 40 receives an input signal at its input R from decoding line 9 that resets the multivibrator 40 until the next horizontal line count.

The IHB multivibrator 42 is set by an output signal, caused by the coincidence of the output decoding line 7 signal from the decoder 24 over a line 62 and the output from an AND gate 64 on line 66, from an AND gate 58 via line 60 to its S input. The input signals to the AND gate 64 are transmitted via lines 35, 37, 38 and the coincidence of the signals on these lines represent 1101 binary or 13 decimal. AND gate 58 then sets the HB multivibrator 42 when the count reaches 125 = ((7×16) + 13) or 3T before a 0 count. The HB multivibrator 42 is reset by a signal transmitted to its R input from the output of AND gate 68 over line 70 which simultaneously senses the reset condition of the HD multivibrator 40 via line 72 and a signal transmitted from decoding line 1 of decoder 22 via line 74. This occurs at 8T after the reset of the HD multivibrator 40, or 17T after a 0 count making the total duration of the HB signal a full 20T.

It can be seen therefore that the first counting circuitry 16 is used to advantageously generate the horizontal control signals of a video telephone according to one object of the invention.

The second frequency division (by 17,088 decimal) is provided by second counting circuitry 76 comprising counters 78, 80 and 82 connected to decoders 84, 86 and 88, respectively. The counters 78, 80 and 82 have inputs and outputs identical to counter 18, 20 and function in the manner hereinbefore described. The decoders 84, 86, 88 have inputs and outputs identical to decoders 22, 24 and function in the manner hereinbefore described. Each counter output $2^0$, $2^1$, $2^2$, $2^3$ is connected via lines 90-101 to the inputs $2^0$, $2^1$, $2^2$, $2^3$ of the associated decoder. Also the counter-decoder combinations function in the same manner as hereinbefore described. Further, each counter 78, 80, 82 has its C input connected to the clocking oscillator 12 via the line 14 to receive the 1024KHz pulses. Counter 82 is enabled by a signal transmitted to its E input from the CR output of the counter 80 over a line 102 and counts once for every sixteen counts of the counter 80. The counter 80 is likewise enabled by a signal to its E input from the CR output of the counter 78 and counts once for every sixteen counts of counter 78. The E input of the counter 78 however receives a signal via line 106 from the decoding line 2 of the decoder 24. The presence of a signal on decoding line 2 is equivalent to a count of 32T (2×16) and allows the counter 78 to count once for every 32T. 32T was chosen to drive the second counting circuitry 76 because of an interlace problem where onehalf a horizontal line is needed. The interlace timing problem makes it desirable to run the slower second counting circuitry first bit at a rate corresponding to the half line rate of 64T and, thus, requires an enabling signal once every 32T. Therefore, it can be seen that counter 78 is a times 32T counter, the counter 80 is a times 512T counter, and the counter 82 is a times 8192T counter.

The second counting circuitry 76 receives a clearing signal on the P inputs of the counters 78, 80, 82 from the output of an AND gate 108 via a line 110. This signal clears the second counting circuitry 76 once it has reached the vertical scanning count of 17,088T or the field rate. The 17,088T count is decoded by the coincidence of signals on lines 116, 112, 114 to the inputs of an AND gate 108. A coincidence occurs on lines 112, 114, 116 (from the decoding lines 1, 6, 2 of the decoders 86, 84, and 88 respectively) when the counter reaches a 17,088T count, or (2×8192) + (1×512) + (6×32).

In this way the basic vertical scan rate is generated by the three counters 78, 80 and 82 which cooperate to count to 17,088T and then are cleared by the AND gate 108 and begin the count again. The majority of the states of the second counting circuitry 76 appear on the decoding lines 0-9 of decoders 84, 86 and 88 to allow a simple combination of three decoding lines to define any of the counting states represented, rather than combining the coincidence of the twelve outputs of the counters 78, 80 and 82.

The decoded states of the counters 78, 80 and 82 are used to set and reset the bistable multivibrators 118, 120, 122 and 124 that generate the vertical control signals VB, VD, VS and the automatic gain control signal, AGC, respectively.

The timing relationships between these vertical control signals and AGC are shown in FIG. 5, where it is seen, the vertical blanking VB signal is set at T=0, has a duration of 1024T or 8 horizontal lines and occurs once every 17,088T. Likewise, the vertical sync signal, VS, initially is set at the same time as the vertical blanking VB but in every other field it is delayed by ½ horizontal line in order to be synchronous with the HD signal (used also as horizontal sync) to be set. This delay results from the interlace timing in which a field is 133½ lines in length and the VS signal is not set until 64T after the start of a new field. The VS signal is reset 99T after a count of T=0 or, in the shortened case 35T after it has been synchronized with the HD signal.

The vertical drive VD, (which occurs once every vertical time period of 17,088T) is set 99T after a count of T=0 and reset one full horizontal line, or 128T, before the vertical blanking VB is reset, and therefore, has a pulse width of 797T. The AGC signal, which appears approximately centered in the vertical time slot, is set at a count of 4608T after T=0 and is reset 4096T before the end of the 17,088 count and, therefore, has a duration of 8384T.

To generate these signals: The vertical blanking VB multivibrator 118 is set by an output signal transmitted to its S input via a line 128 from an AND gate 126 which has an output in response to the coincidence of input signals from decoding line 0 of the decoders 84, 86 and 88 over lines 130, 132 and 134, respectively. The VB multivibrator 118 is reset by a signal from decoding line 2 of the decoder 86 via line 136 which indicates 1024T (2×512) has elapsed since a T=0 count was registered.

The VS signal is similarily generated by a multivibrator 122 which is set by an output signal from an AND gate 140 via a line 142. AND gate 140 produces the setting output when the coincidence of the HD signal and the VB signal set from the output of AND gate 126 is sensed via lines 138 and 128, respectively. The VS multivibrator 122 is reset by a signal transmitted over line 144 from AND gate 146 which has an output when the coincidence of signals from decoding lines 3, 3 of the decoders 84, 22 are detected on lines 148 and 150, respectively. The output of AND gate 146 resets the multivibrator 122 on the occurrence of a count of 99T (3×32 + 3×1) after a count of T=0.

The vertical drive multivibrator 120 is set in a similar manner by an output signal from an AND gate 152 over a line 154. Gate 152 generates this setting signal when the coincidence of the VS reset signal from AND gate 146 and the VB set signal from AND gate 126 is sensed via lines 144 and 128, respectively. The multivibrator 120 is reset by an output from AND gate 156 which occurs when signals from outputs $2^2$, $2^3$ of the counter 78 and decoding line 1 of the decoder 86 appear coincidently on lines 92, 93 and 112, respectively. This happens at a count of 512×1 + 12×32 or 896T and corresponds to the resetting of VD 797T after VD was set (at 99T).

The AGC multivibrator 124 is set by an output signal via line 162 from AND gate 160 which occurs when the signals from decoding lines 9, 1 of the decoders 84 and 86 and the output from AND gate 28, transmitted over lines 164, 166 and 30, respectively, are coincident (when a count of 9×512 or 4608T has been reached) and produces the setting signal to the AGC multivibrator 124 synchronously with the next beginning horizontal line signal present on line 30. The AGC multivibrator 124 is reset via line 170 when AND gate 168 has an output, indicating the coincidence of decoding line 1 of the decoder 88 signal, the beginning of a horizontal line signal, and the presence of a decoding line 9 signal on lines 166, 30 and 164, respectively.

Figure 3:
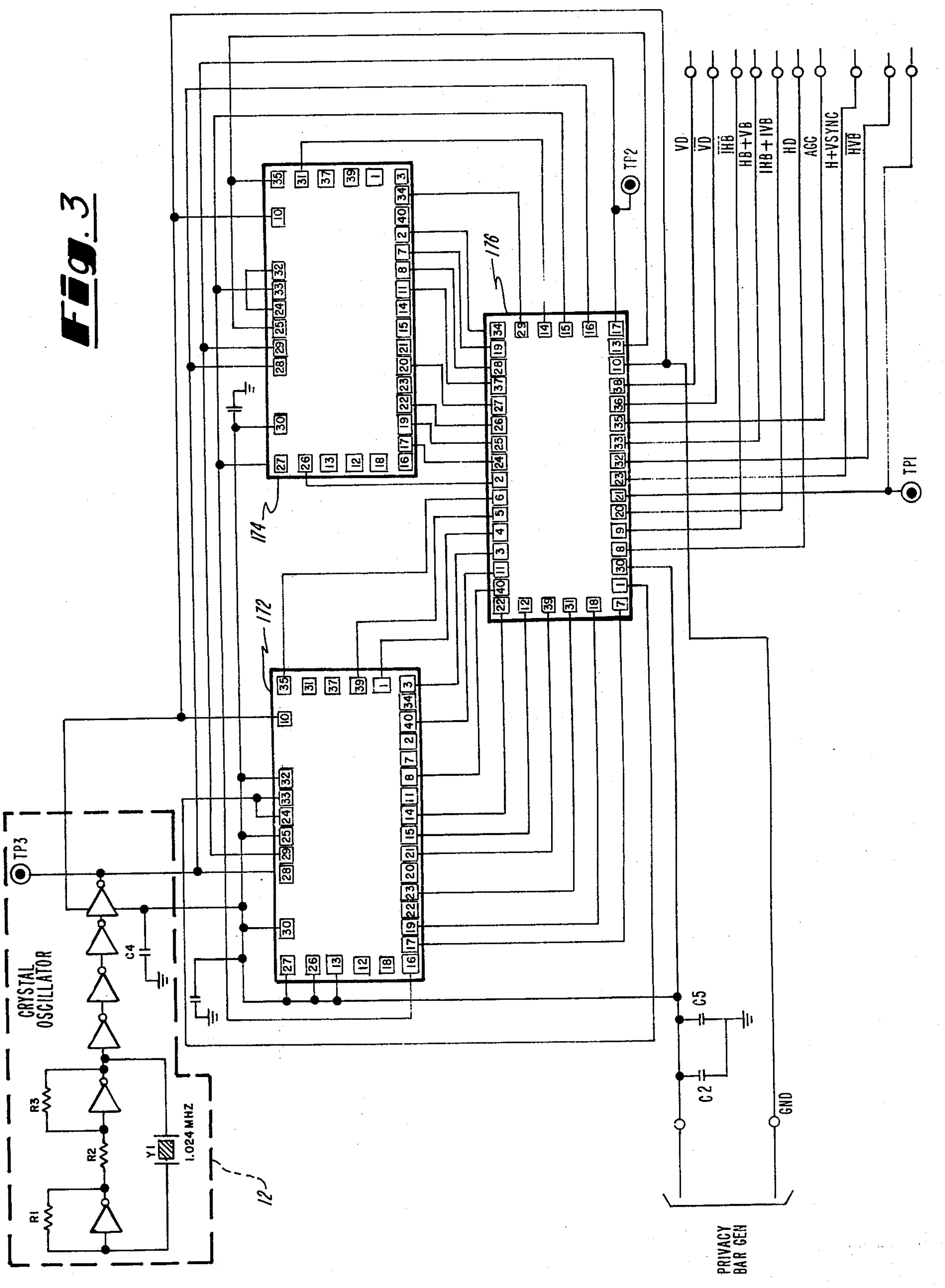

A second embodiment of a synchronous generator implemented according to the invention is shown to advantage in FIG. 3. The counters, decoders, coincidence circuitry, and multivibrators of the present invention are implemented by three integrated circuit packages (ICP) 172, 174 and 176 fabricated by MSI circuitry techniques. Each ICP 172, 174 and 176 is a multipin package having a plurality of inputs I and outputs O (more fully described below) and connected together to form the generator of the invention. ICP 172 and ICP 174 are identical packages and contain two, four-bit counters and their associated decoding circuitry, while ICP 176 contains one counter-decoder combination, the generator's coincidence circuitry and multivibrators that generate the horizontal and vertical control signals for the video telephone. In addition, gating is provided within ICP 176 in order to produce the composite horizontal and vertical signals useful in controlling camera and picture gun circuits for video telephones.

The composite signals, the horizontal and vertical controlling signals, AGC, and the privacy bar signal are connected to outputs of ICP 176 and brought to pins for connection to control circuitry (not shown). Since, ICP's 172 and 174 are identical and the remaining generator circuitry is provided by ICP 176, the entire generator is comprised of only two different ICPs and is manufactured with an optimal number of three packages. This ease in manufacture, the miniaturization of circuitry with resultant space saving and the MSI integration of the generator are all according to before mentioned objects of the invention.

Figure 2A:
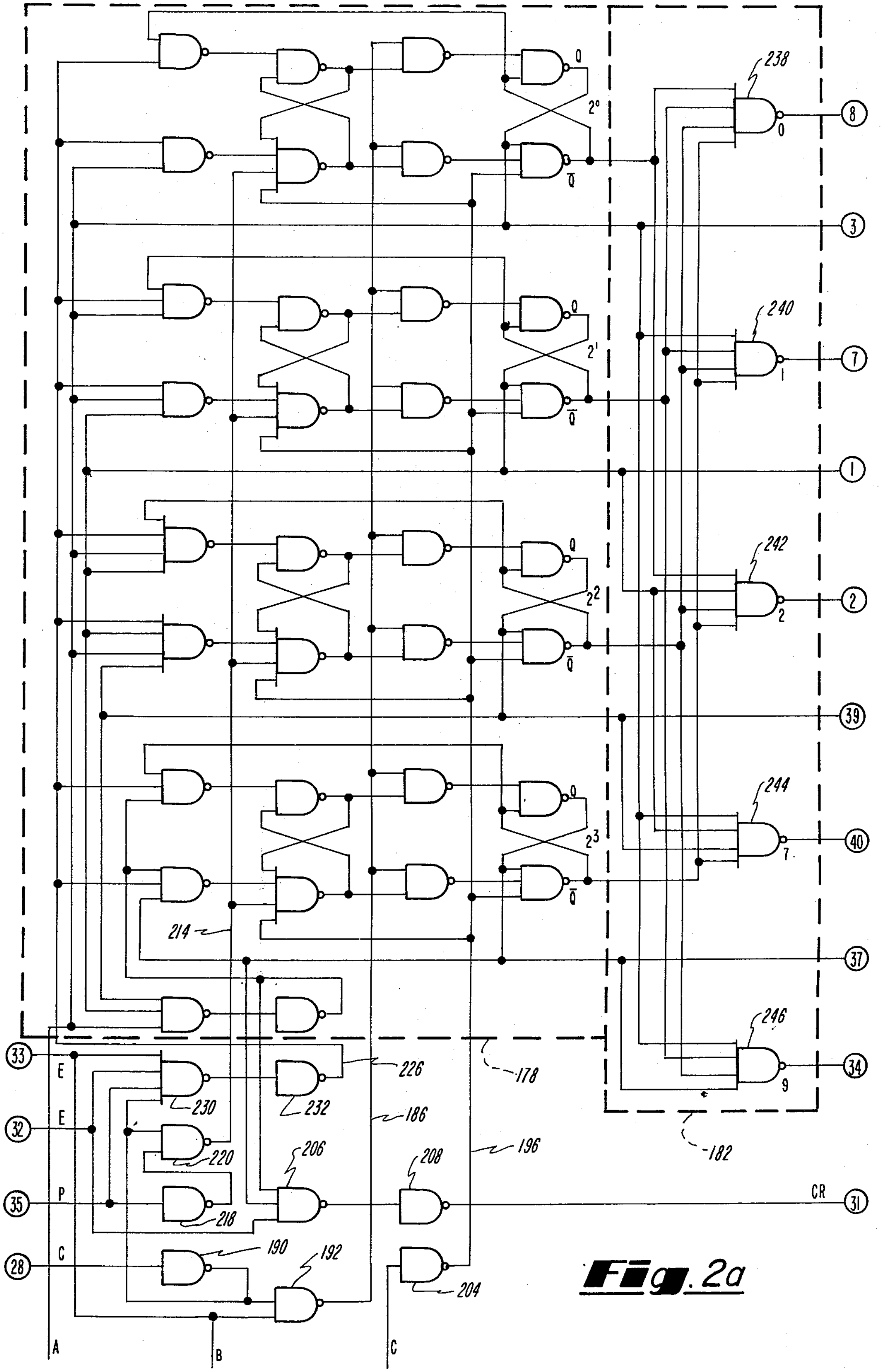
FIGS. 2, 3, 4 are schematic diagrams of an advanced MSI implementation of the invention.
Figure 2B:
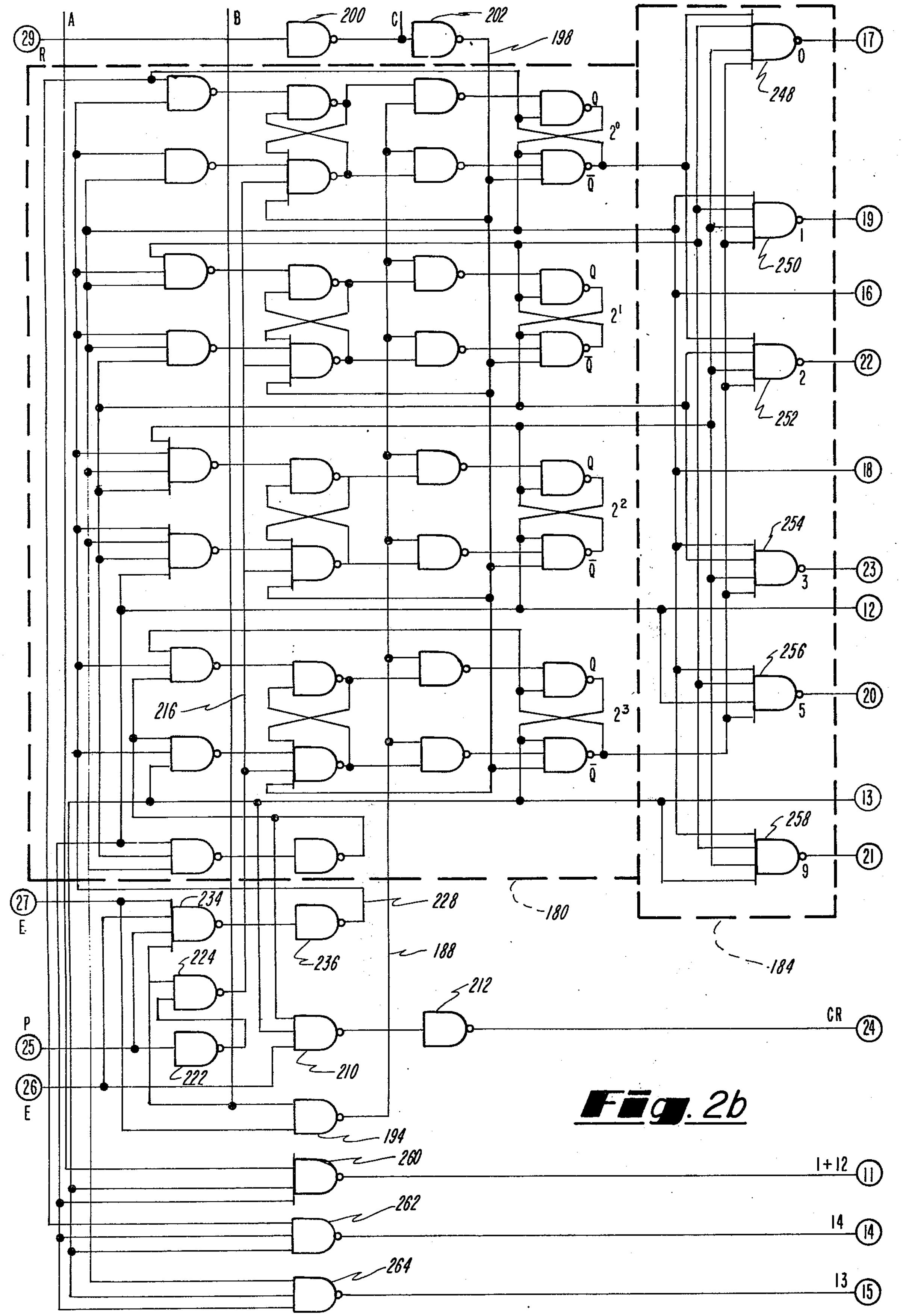

The circuitry comprising ICP 172 (and ICP 174) is shown in FIGS. 2*a* and 2*b* which have identically labeled inputs and outputs as the ICP 172 (and the ICP 174) shown in FIG. 3.

FIGS. 2*a* and 2*b* (having inputs on the left of the drawing and outputs on the right) illustrate 2 four-bit binary ripple counters 178 and 180 built by integrated circuit fabrication techniques from a plurality of NAND gates using a common configuration known in the art. Each counter has four stages with outputs $2^0$, $2^1$, $2^2$, $2^3$ with master-slave flip-flops ripple gating, clearing, enable, preset, and clocking lines.

Input 28 corresponds to the C input of the counters 18, 20 as described above and transmits pulses to NAND gates 192 (via gate 190) and 194. Gates 192 and 194 have outputs (when enable signals are present on inputs 33 and 27, respectively) via clocking lines 186, 188 in the counters 178 and 180, respectively. Further, each counter 178, 180 is provided with a master reset input 29 that clears (via gates 204 and 200, 202) both counters when a reset signal is transmitted thereto. A carry output 31 for counter 178 and a carry output 24 for counter 180 are provided for counter overflow. When the overflow condition (a 1111 binary condition for the associated counter) is sensed for counters 178, 180 by gates 206 and 208, 210 and 212, respectively, the carry outputs 31, 24 are enabled by enable inputs 32, 26 respectively. Each counter 178, 180, further, has a preset input 35, 25 respectively, that propagates a clearing signal to lines 214, 216 respectively, through gates 218 and 220, 222 and 224 respectively, upon synchronization with the clock pulses on input 28 which are transmitted via and inverted by gate 190.

A master enable signal is provided along lines 226, 228 for counters 178, 180 respectively via gates 230 and 232, 234 and 236, respectively sensing the coincidence of the enable signals from inputs 33, 27, enable signals from inputs 32, 26, preset and clock signals.

Therefore, it will be appreciated that the counters 178, 180 may be used in a manner similar to the counters disclosed in the preceding embodiment. Accordingly, the outputs $2^0$, $2^1$, $2^2$, $2^3$ of the counters 178, 180 are decoded by the line decoders 182, 184 to form the plurality of signals needed between the horizontal and vertical scan rates. The decoders each are comprised of a plurality of four input NAND gates that decode the coincidence of outputs from the counters corresponding to a certain binary number. The decoding gates then produce an output signal indicating the number has been counted. Decoder 182 has a decoding gate 238 producing a 1 count signal to output 7, decoding gate 242 producing a 2 count to output 2, decoding gate 244 producing a 7 count signal to output 40, decoding gate 246 producing a 9 count to output 34.

Therefore, it is seen that the counter-decoder combination 178, 182 may be used to implement either, counter-decoder combination 20, 24 or counter-decoder combination 80, 86 by an integrated circuit packaging technique in ICP 172 and 174.

Likewise, decoder 184 has decoding gate 248 producing a 0 count signal to output 17, decoding gate 250 producing a 1 count signal to output 19, decoding gate 252 producing a 2 count signal to output 22, decoding gate 254 producing a 3 count signal to output 23, decoding gate 256 producing a 5 count signal to output 20, and decoding gate 258 producing a 9 count signal to output 21.

Therefore, it is seen that the counter-decoder combination 180, 184 may be used to implement either counter-decoder combination 18, 22 or counter-decoder combination 78, 84 by an integrated circuit packaging technique in ICP 172 and 174.

Further, decoding in ICP 172, 174 is provided in the manner described above by a decoding gate 260 which produces a combinational 1 count from counter 178 and a 12 count from counter 180 at output 11, decoding gate 262 which produces a 14 count signal at output 14, and decoding gate 264 which produces a 13 count signal at output 15.

It is apparent then the first counting circuitry shown in FIG. 1 may be implemented by connecting the circuitry disclosed in FIGS. 2*a*, *b* in the manner of ICP 172 in FIG. 3. ICP 172 has E inputs 26, 27 and P input 25 connected to a positive voltage to permit the enabling of the counter 180 to advance once each time it receives pulses from clocking means 12 at input 28. The CR output 24 of counter 180 in ICP 172 is then connected to the E input 33 of counter 178 allowing it to count once for every sixteen counts of counter 180. The E input 32 of counter 180 is tied to a positive voltage to permit the enabling of the preset line 214 at all times. In this way counter 180 becomes a times one counter and counter 178 becomes a times sixteen counter.

As described above the first counting circuitry is preset to zero when it reaches a count of 128T. This preset signal is produced by the output of gate 368 (FIG. 4*a*) and is transmitted from output 6 on ICP 176 to the preset input 35 of counter 178 on ICP 172. Gate 368 senses the coincidence of the CR output 24 of ICP 172 and the $2^0$, $2^1$, $2^2$ outputs of counter 178 (through input 1, 3, 4, 5 of ICP 176) which occurs at the 128T (7×16 + 16) count.

Figure 4A:
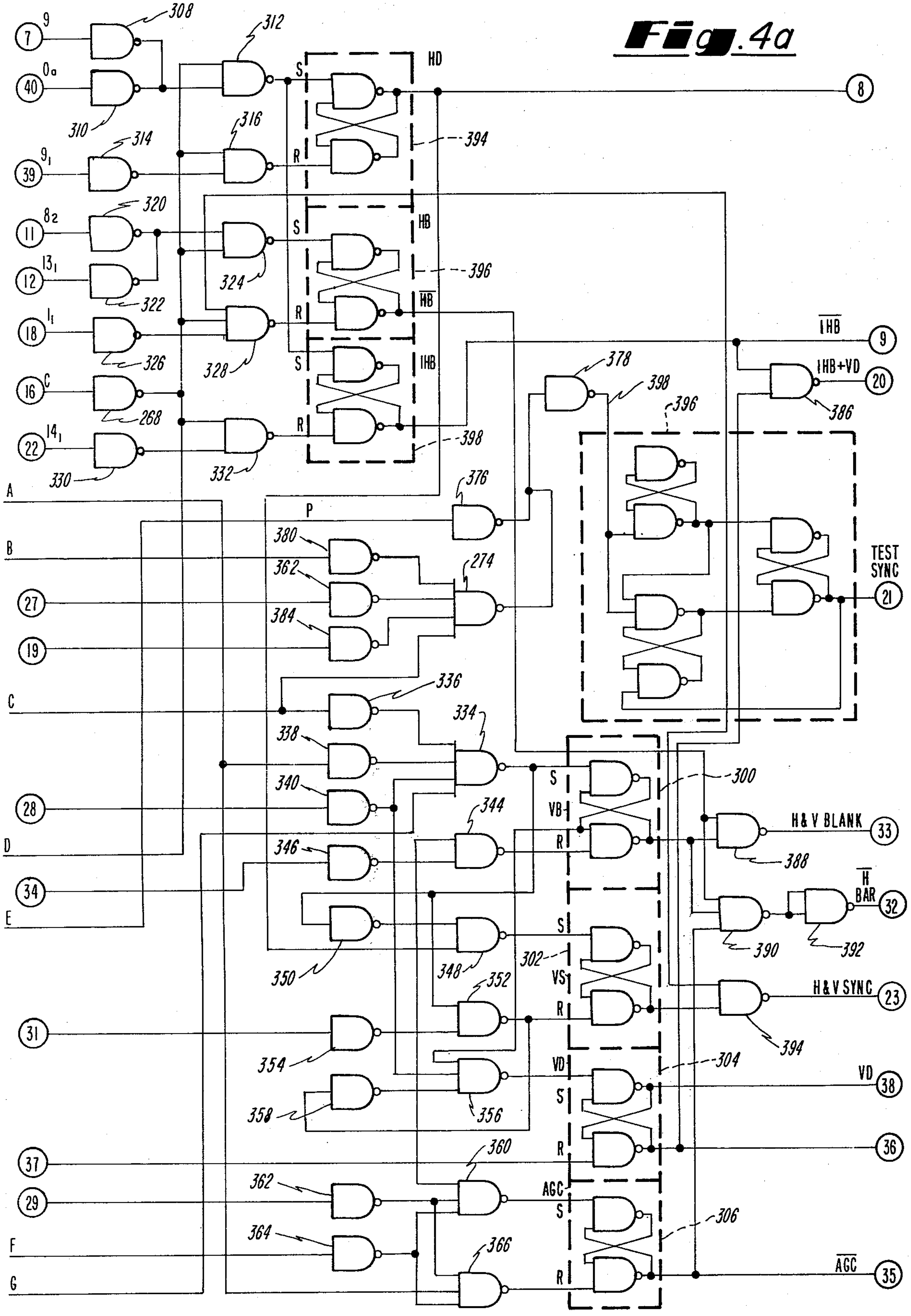
Figure 4B:
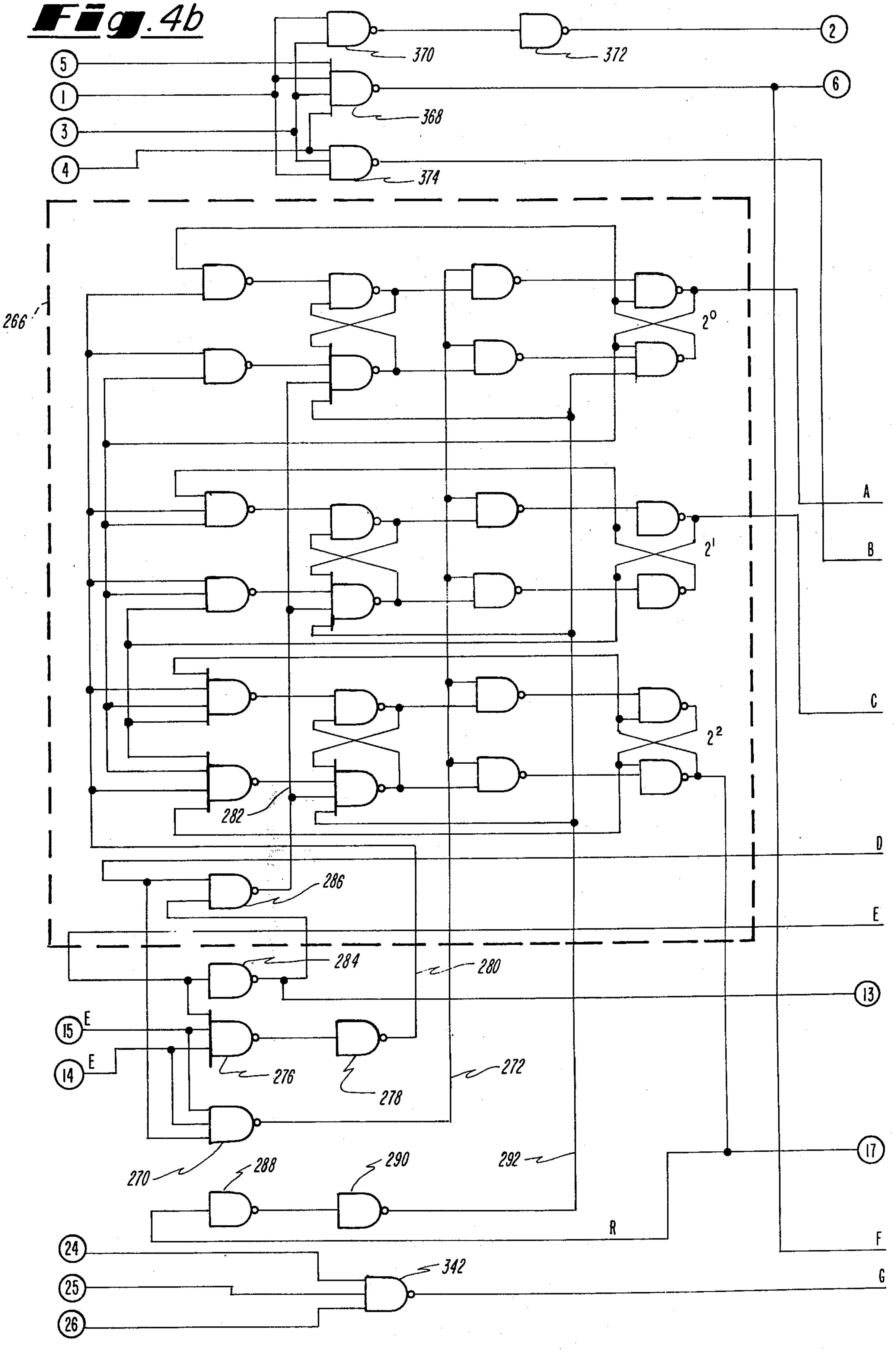

FIGS. 4*a* and *b* illustrate circuitry, contained within ICP 176, which forms the generator logic not included within ICP 172, 174. A 3-stage binary counter 266 of the type described above has been implemented by integrated circuit technology. The counter 266 has outputs $2^0$, $2^1$, $2^2$ that need no decoding as each bit is used without combination of the others. The counter 266 receives a clock signal from input 16 through gates 268 and 270 and via clock line 272 (in order to advance the counter) when gate 270 also receives enabling signal from inputs 14, 15. The coincidence of enabling signals from inputs 14, 15 in combination with a signal from gate 268 and a preset signal from gate 274 produce an output signal from gate 276 (via gate 278) to an enabling line 280 permitting the counter to ripple signals from stage to stage. The remaining control line which clears the counter is the preset line 282 which has a clearing signal developed thereon by a preset signal transmitted from a gate 284 which is synchronously detected with a clock signal from gate 268 by gate 286. Finally, a master reset is provided by the output $2^2$ through gates 288, 290 to a reset line 292 and an output 17.

The master reset signal from the output 17 is also used to clear all counters in ICP 172, 174 through inputs 29 when the output $2^2$ of counter 266 becomes high. This master reset signal ensures synchronization between the first and second counting circuitry if the counters start in a state higher than the individual resets.

From the foregoing discussion it is apparent that the second counting circuitry shown in FIG. 1 may be implemented by combining the circuitry disclosed in FIG. 2*a*, *b* and FIG. 4a, b in the manner of ICP 174 and ICP 176 shown in FIG. 3.

The clock for the second counting circuitry enters inputs 28 of ICP 174 and 16 of ICP 176 to provide pulses at 1024 KHz to the counters 178, 180, 266. The E input 27 of counter 180, the E input 33 of counter 178, and the E input 15 of counter 266 are connected to the $2^0$ output of the first counting circuitry through output 16 of ICP 172. This connection permits the first and second counting circuitry to remain in sync with each other and substantially eliminates the effects of any ripple delay that might cause phase distortion.

The E input 14 of counter 266 of ICP 176 receives a signal from the CR output 31 of counter 178 on ICP 174 and enables the counter 266 to advance once for every sixteen counts of the counter 178. Also, counter 178 on ICP 174 is enabled once every sixteen counts of counter 180 by having its E input 32 connected to the CR output 24 of the counter 180. Similarly counter 180 of ICP 174 is enabled by a signal to its E input 26 to advance it once for every 32 counts of counter 178 of ICP 172. The 32 count from counter 178 travels through output 1 of ICP 172 to input 3 of ICP 176, and then to the E input 26 of counter 180. Connecting the counters 178, 180, 266 as described above establishes the counter 180 as a times 32 counter, the counter 178 as a times 512 counter and the counter 266 as a times 8192 counter thereby implementing the second counting circuitry. A preset signal is developed at ICP 176, output 13, from the output of gate 284 to clear the counter of ICP 174 when the vertical scan rate has been reached. The preset is applied from output 13 of ICP 176 to P inputs 25, 35 of ICP 174 every 17,088T, as will be more fully described below.

The bistable multivibrators that generate the horizontal and vertical signals are also provided on ICP 176. Each multivibrator is formed by the cross coupled feedback of the output of two NAND gates generally known to the art to form a R-S flip-flop with an S input producing a set condition on the Q output and an R input producing a reset condition at the Q output. The multivibrators 294, 296, 298, 300, 302, 304, 306 generate the HD, HB, IHB, VB, VS, VD, AGC signals respectively.

The setting and resetting of the multivibrators takes place in the manner hereinbefore described wherein the decoding lines of the decoders are detected by coincidence circuitry to produce the required input signals upon a certain count. The HD multivibrator 294 receives a setting signal when gates 308, 310 and 312 detect a 0, 0 count from ICP 172 (the horizontal counter) on inputs 7, 40 and is reset when gates 314, 316 detect a 9 count from ICP 172 over input 39. Likewise, HB multivibrator 296 is set by gates 320, 322, 324 detecting a count of 125 (7×16 + 13) from ICP 172 over inputs 11, 12 and is reset by gates 326, 328 detecting the HD reset signal from a 1 count from ICP 172 over input 18.

The IHB multivibrator 298 is set at the same time as HD multivibrator 294 by gates 308, 310, 312 and is reset by gates 330, 332 detecting a 14 count from ICP 172 over input 22. All the horizontal setting and resetting signals happen synchronously with the clock output from gate 268 as gates 312, 316, 324, 328, 332 are enabled when gate 268 has an output.

The vertical multivibrators in general have similar coincidence circuitry to that described above in that the VB multivibrator 300 is set by gates 334, 336, 338, 340, 342 decoding a count of 0, 0 from ICP 174 over inputs 24, 25, 26, 28 and a 0 count from counter 266 by decoding the inversion of outputs $2^0$, $2^1$. The VB multivibrator is reset when gates 344, 346, 338 decode a count of 1024T (2×512) from ICP 174 over input 34 and the counter 266 output $2^0$ not high.

The VS multivibrator 302 is set by gates 348, 350 decoding the coincidence of the setting of HD multivibrator 294 and a VB set signal from VB multivibrator 300. Resetting of VS multivibrator 302 occurs 99T after the setting of the VB multivibrator 300. The 99T count is decoded by gates 352, 354 where a count of 3 is decoded from ICP 172 over input 31 and a count of 96T from the output of gate 334.

The VD vertical drive multivibrator 304 is set by gates 356, 358, 340 decoding the reset signal to VS multivibrator 302 while VB is set and during a 0 count of counter 178 over input 28. The reset is supplied by the output of decoding gate 260 from ICP 174 over input 37. This count is (12×32 + 11×512) 896T after the vertical field count has begun.

The AGC multivibrator 306 is set by gates 362, 360, 364, 338 decoding a count of 4608T or 9×512 from counter 178 of ICP 174 over input 29, while the $2^0$ output of counter 266 is not set and synchronously with the start signal of a horizontal line from the output of gate 368. The AGC multivibrator 306 is reset by gates 366, 364 when the $2^0$ output of counter 266 becomes set 8192T after AGC has been set.

A test sync signal generated within ICP 176 is developed by multivibrator 396 where 6 NAND gates are used to make a T-flip-flop of prior art design with T input line 398 and Q output to output 21. The test sync signal has a duration of one field or 17,088T and is set and reset alternately by the preset signal to counters 266 of ICP 176, 170 and 180 of ICP 174 toggling the T input line. This preset signal is formed by gates 274, 380, 382, 384, 374 decoding a count of 17,088 or (2×8192 + 1×512 + 5×32 + 2×16) from signals over inputs 1, 3, 4, 27, 19 and the output $2^1$ of counter 266.

The composite signals illustrated in FIG. 5 are formed by the logical combination of the horizontal and vertical signals in gates 386, 388, 390 (and 390) and 394. A composite intermediate blanking signal is produced by the output of gate 386 and appears as output 20 of ICP 176. Gate 386 produces the logic equation 0 = VD + IHB. Likewise, composite blanking is formed by the combination of VB + HB in gate 388. HD and VS are also combined in gate 394 to produce a composite sync signal. The privacy bar signal is a combination of the coincidence of the inverted AGC signal and inverted composite blanking and is produced via gates 390, 392.

Thus, there has been shown a sync generator producing synchronous video signals for a telephone subscriber set implemented using ICPs 172, 174, 176 by connecting inputs and outputs as shown in FIG. 3.

While particular embodiments have been described in detail, it will be understood that various modifications obvious to those skilled in the art may be made without departing from the scope of the invention hereinafter claimed.

What is claimed is:

1. A synchronous signal generator for use in videotelephone systems; said generator comprising:

oscillator means including an output for generating signals having a stable first frequency of pulses;

first binary counting means, connected to the output of said oscillator means, for counting said first frequency of pulses and producing a first count of pulses;

second binary counting means, connected to the output of said oscillator means and to an intermediate output of said first counting means, for counting said first frequency of pulses and producing a second count of pulses;

decoding means connected to said first and second counting means for providing output signals at selected integral counts of said first frequency of pulses; and signal means connected to at least one output of said decoding means for generating at least one control signal synchronously with said output signals, said first and second counting means cooperating to produce at least third and fourth counts of pulses which are intermediate said first and second counts of pulses, respectively.

2. A signal generator for video-telephone systems as defined in claim 1 wherein:

said first count of pulses is equal to the horizontal line scan rate of said systems.

3. A signal generator for video-telephone systems as defined in claim 1 wherein:

said second count of pulses is equal to the vertical field scan rate of said systems.

4. A signal generator for video-telephone systems as defined in claim 3 wherein:

said intermediate output of the first counting means produces a count of pulses equal to one quarter said first count of pulses whereby said second counting means counts in increments of one-half of the horizontal line scan rate and; wherein said second count is an odd multiple of horizontal half lines to provide for interlacing adjacent vertical fields.

5. A signal generator for video-telephone systems as defined in claim 4 wherein said first counting means includes:

a first four bit binary ripple counter, connected to said oscillator means, for dividing said first frequency of pulses by a factor of sixteen; and a second four bit binary ripple counter, connected to said oscillator and enabled by a carry output of said first binary counter, for dividing said first frequency of pulses by a factor of two hundred fifty-six; wherein said first count is an integral count evenly divisible by four of said first and second binary counters and said first counting means includes a first preset signal means for clearing said second binary counters upon the obtainment of said first count.

6. A signal generator for video-telephone systems as defined in claim 5 wherein said second counting means includes:

a third four bit binary ripple counter, connected to said oscillator means, for dividing said intermediate count of pulses by a factor of sixteen, a fourth four bit binary ripple counter connected to said oscillator means and enabled by a carry output from said third binary counter for dividing said intermediate count by a factor of two raised to the eighth power and a fifth four bit binary ripple counter connected to said oscillator means and enabled by a carry output from said fourth binary counter, for dividing said intermediate count by a factor of two raised to the twelfth power wherein said second count is an integral count of said third, fourth, and fifth binary counters and said second counting means includes a second preset signal means for clearing said third, fourth and fifth binary counters upon the obtainment of said second count.

7. A signal generator for video-telephone systems as defined in claim 6 wherein said first and second counting means include resetting means for resetting said first, second, third, fourth and fifth binary counters upon a count larger than said second count and independently of said first and second preset signals.

8. A signal generator for video-telephone systems as defined in claim 7 wherein said oscillator means are crystal controlled and said first frequency of pulses is one thousand and 24 KHz, and wherein each pulse width of said first frequency is substantially smaller than the resolution between said control signals.

9. A signal generator for video-telephone systems as defined in claim 8 wherein said signal means includes a a plurality of R-S multivibrators having a high frequency group of said multivibrators for generating horizontal control signals, a lower frequency group of said multivibrators for generating vertical control signals, and combinational means for producing composites of said horizontal and vertical control signals.

10. A signal generator for video-telephone systems as defined in claim 9 wherein said combinational means includes privacy means for generating a privacy bar signal allowing audio communication in said systems without video transmission.

* * * * *